United States Patent Office 3,077,494
Patented Feb. 12, 1963

3,077,494
ALKOXIDE CATALYSIS FOR URETHANE FORMATION
James R. Griffith, 4201 53rd Ave., Bladensburg, Md.
No Drawing. Filed July 5, 1960, Ser. No. 40,979
3 Claims. (Cl. 260—471)
(Granted under Title 35, U.S. Code (1952), sec. 266)

The invention described herein may be manufactured and used by or for the Government of the United States of America for governmental purposes without the payment of any royalties thereon or therefor.

This invention relates to urethane formation and, more specifically, to catalytic method for forming urethanes by the reaction of tertiary alcohols with isocyanates.

While it is known to prepare carbamates (urethanes) in sufficient yields by reacting primary and secondary alcohols with isocyanates at room temperature, application of this same procedure to tertiary alcohols is not practical since yields of not more than about 10% of the desired carbamates are thereby obtained. The uncatalyzed reaction of tertiary alcohols with isocyanates is for practical purposes non-existent at room temperature, while at elevated temperatures the reaction yields dehydration products. There is therefore no satisfactory method for preparing urethanes of tertiary alcohols comparable to those for the primary and secondary alcohols. The sensitivity of the carbinol center toward urethane formation falls off rapidly as hydrogen atoms are replaced by hydrocarbon groups, and the necessity for heating promotes the formation of ureas and olefins along with small amounts of urethanes. In fact, olefins are formed in such appreciable quantities that heretofore isocyanates have been recommended as convenient dehydrating agents for tertiary alcohols.

It has now been discovered that relatively high yields of urethanes of the tertiary alcohols may be obtained if the esterification is carried out in the presence of an alkali metal alkoxide at room temperature, and the reaction is both rapid and convenient in forming new urethanes which have not been possible to produce by previous methods. The addition of an alkali metal alkoxide has also been found useful for urethane formation of secondary alcohols which generally require increased temperatures to react with the isocyanates.

The urethanes of this invention are prepared rapidly and in sufficient yields by reacting tertiary alcohols and secondary alcohols containing therein catalytic amounts of alkali metal alkoxides of lithium, sodium or potassium metal with an isocyanate, for instance, phenyl isocyanate or 1-naphthyl isocyanate, until the reaction is substantially complete. The reaction is carried out very rapidly, with or without a solvent, although the inclusion of a low-boiling solvent helps to keep the reaction mixture cool and thus avoids alcohol dehydration.

In practising the invention, an alkoxide is introduced into the tertiary alcohol, preferably by dissolving lithium, sodium or potassium metal directly therein. The tertiary alcohol and the isocyanate are then reacted in equal molecular proportion in the presence of the alkali metal alcoholates, but it is found desirable to have an excess of the alcohol present to suppress a too-vigorous, exothermic side reaction. Of the alkali metals, referred to above, lithium is more advantageous for this purpose, since lithium alkoxides are generally more soluble in organic solvents and dissolve in greater concentrations in the higher molecular weight alcohols than the corresponding sodium or potassium salts. Lithium, moreover, is less active than either sodium or potassium in reactions with active hydrogen; consequently, in forming alkoxides with alcohols which must be melted initially before the alkali metal can be added thereto, the lithium metal reacts less vigorously with the molten alcohols thereby preventing any uncontrolled reactions.

The alkoxides of liquid alcohols are readily prepared by the addition of small pieces of freshly-cut alkali metal to thoroughly dried alcohols. In some instances it is necessary to pulverize the alkali metal in order for the reaction to proceed satisfactorily. Caution should be exercised because the reaction may tend to accelerate continuously until charring occurs. This acceleration can be avoided if the container is submerged in a cooling medium. With higher molecular weight alcohols, it is usually found necessary to warm the alcohol slightly to initiate the reaction.

The alkoxides of the solid alcohols which melt below 70° C. are readily prepared by the direct addition of alkali metal to the melt. Alcohols that melt between 70 and 120° C. will form alkoxides if the rates of hydrogen evolution are carefully controlled. The alkoxides are more difficult to prepare, however, from alcohols having higher melting points, for the alkali metal alkoxides are usually insoluble in the alcohol melts.

The tertiary acohol urethanes contemplated by the present invention comprise those which are derived from isocyanates having the general formula:

in which R represents an aromatic or an aliphatic hydrocarbon radical; the tertiary alcohols represented by the general formula:

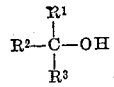

in which $R^1$, $R^2$ and $R^3$ are also aromatic or aliphatic hydrocarbon radicals, namely, alkyl, aryl, aralkyl or alkaryl groups may be of the saturated or unsaturated type and in general the radicals may also have substituted groups, such as the halogens.

Tertiary alcohols which are not sterically laden with aryl groups about the tertiary carbon atom form urethanes more readily, although it is possible to form urethanes having a considerable number of aryl groups attached thereto. Illustrative examples of alcohols capable of combining with an isocyanate molecule are the saturated aliphatics, e.g. 2-methyl-2-propanol, 2-methyl-2-butanol, 2-methyl-2-pentanol, 3-methyl-3-pentanol, 3-ethyl-3-pentanol, 3-ethyl-3-nonanol, etc.; the unsaturated aliphatics, e.g. 3-methyl-1-butyn-3-ol, 3-methyl-1-pentyn-3-ol, 3,5-dimethyl-1-hexyn-3-ol, etc.; cyclic type such as 1-ethyl cyclohexanol; the aryl type, for instance, 1,1-diphenylethanol, 1,1,2-triphenylethanol, etc. The isocyanates, by way of example, are represented by the phenyl isocyanate and the 1-naphthyl isocyanate.

The new tertiary alcohol urethanes formed by means of the present invention are generally white, crystalline solids, often of needle structure, soluble in most organic solvents and insoluble in water. They are valuble compounds in the preparation of a variety of commercially valuable chemical products. They are particularly useful as weed killers: under greenhouse conditions many of the phenylcarbamates are active. At 1 lb./acre the growth of cereal seeds may be completely inhibited. At a concentration of 500 p.p.m. the more active of these are herbicidal against quack grass. Their chlorinated derivatives are also useful as insecticides. Urethanes in recent years have appeared promising in the fight against leukemia and clinical studies are now in progress on many of these compounds.

A few typical tertiary alcohol urethanes are given in the following table, although these are understood to be merely exemplary of the broad class of compounds as described herein.

TABLE

| Carbamate of— | | Melting Points, °C. |
|---|---|---|
| Tertiary Alcohol | Isocyanate | |
| 3-methyl-1-butyn-3-ol | Phenyl isocyanate | 130–131 |
| 2-methyl-2-pentanol | do | 52–53 |
| Do | 1-Naphthyl isocyanate | 135–136 |
| 3-methyl-1-pentyn-3-ol | Phenyl isocyanate | 91–92 |
| 1-ethynyl cyclohexanol | do | 166–167 |
| 3-methyl-3-nonanol | 1-Naphthyl isocyanate | 39–40 |
| 1,1-diphenylethanol | do | 144–145 |
| 1,1,2-triphenylethanol | do | 170–171 |

The following examples are illustrative of this invention:

Example I

Into a 250 ml. three-necked flask fitted with a reflux condenser, a stirring motor and an addition funnel was placed 60.0 grams (0.68 mole) of tertiary amyl alcohol which had been dried over calcium hydride. In the alcohol was dissolved 0.2 gram of lithium metal and then 100 ml. of ethyl ether, which had been dried over calcium hydride, was added to the flask. From the addition funnel 40.0 grams (0.34 mole) of phenyl isocyanate was added dropwise or just rapidly enough to keep the solution boiling gently. Upon completion of the isocyanate addition, the resulting solution was transferred to a separatory funnel and extracted with five 100-ml. portions of water. After the ethereal solution was dried over anhydrous calcium sulfate, the ether was removed by evaporation on a warm water bath, and the residue that remained was dissolved in 90 ml. of petroleum ether. The solution was then cooled to room temperature and allowed to remain until the carbamate had precipitated. The precipitated carbamate was removed by filtration, two-thirds of the petroleum ether was removed by evaporation and the filtrate was placed at −20° C. for 24 hours. The following day additional precipitate had formed which was removed by filtration and combined with that previously obtained. The combined precipitates were then recrystallized from petroleum ether to yield 56.0 grams (81%) of pure tertiary amyl N-phenylcarbamate, M.P. 42° C.

Example II

After 0.5 gram of lithium metal was dissolved in 85.0 grams (0.68 mole) of 3,5-dimethyl-1-hexyn-3-ol, 40.0 grams, (0.34 mole) of phenyl isocyanate were added to the alcohol dropwise over a period of 45 minutes while the solution was stirred constantly. Upon complete addition of the isocyanate, 100 ml. of petroleum ether (B.P. 100–120° C.) was added and the mixture was heated to boiling. After 9 grams of an insoluble residue was removed by filtration, the filtrate was cooled overnight at −20° C. The next day 64 grams of crude carbamate (urethane) was removed by filtration. This solid was recrystallized from 100 ml. of petroleum ether by cooling to −20° C. to yield 45.5 grams (55%) of pure 3,5-dimethyl-1-hexyn-3 N-phenylcarbamate, M.P. 77–78° C.

Most of the solid tertiary alcohols are low-melting solids and the lithium alkoxides may be prepared from the melt, with proper precautions to avoid an uncontrolled reaction during the alkoxide formation. It is generally advantageous to prepare the alkoxides in fractional amounts of the total alcohol and to add this catalytic solution in increments to the urethane reaction.

Example III

The dry alcohol, 2-methyl-3-butyn-2-ol, is divided into a small portion, of about 3 grams, and a larger portion of 54 g. (total 0.68 mole) which is placed in a three-neck flask fitted with reflux condenser, stirrer and separatory funnel and dissolved in 100 ml. of dry ether. The smaller portion is treated with a freshly-cut piece of lithium metal about 0.2 of a gram and warmed to accelerate the evolution of hydrogen. One-half of the dissolved catalyst is added to the flask. While the solution is stirred rapidly, 40.0 g. (0.34 mole) of phenyl isocyanate is added dropwise by way of the separatory funnel at such a rate as to keep the ether boiling gently. The remaining catalyst is added in portions as needed. The ether is evaporated after completion of the reaction, and the urethane is extracted and recrystallized from petroleum ether. The yield of pure 2-methyl-3-butyn-2-N-phenyl carbamate is 64.8 g. (94%), M.P. 130–131° C.

Obviously many modifications and variations of the present invention are possible in the light of the above teachings. It is therefore to be understood that within the scope of the appended claims the invention may be practiced otherwise than as specifically described.

What is claimed is:

1. In the method of preparing urethanes by the reaction of a tertiary alcohol with an isocyanate, the improvement which comprises conducting the reaction in the presence of an alkali metal alkoxide at a temperature in the range of about 20 to 30° C.

2. In the method of preparing urethanes by the reaction of a tertiary alcohol with an isocyanate, the improvement which comprises conducting the reaction in the presence of lithium alkoxide at a temperature in the range of about 20 to 30° C.

3. In the method of preparing urethanes by the reaction of a tertiary alcohol with an isocyanate, the improvement which comprises adding an alkali metal alkoxide of said tertiary alcohol in small amounts sufficient to catalyze said reaction at a temperature in the range of about 20 to 30° C.

References Cited in the file of this patent

UNITED STATES PATENTS 2,860,166     Newcomer et al. _____ Nov. 11, 1958

OTHER REFERENCES

Dieckmann et al.: Ber. Deut. Chem., 37, 4627–38 (1904).

Chabley: Beilstein's Handbuch (4th edition), volume 1, page 381 (1918).

Tarbell et al.: Jour. Am. Chem. Soc., volume 64, pages 2229–2230 (1942).